May 30, 1933.  V. BENDIX ET AL  1,911,420

BRAKE

Filed Dec. 3, 1927   2 Sheets-Sheet 1

INVENTOR
VINCENT BENDIX
LUDGER E. LA BRIE
BY
M. W. McConkey
ATTORNEY

May 30, 1933.  V. BENDIX ET AL  1,911,420
BRAKE
Filed Dec. 3, 1927  2 Sheets-Sheet 2

INVENTORS
Vincent Bendix
Ludger E. LaBrie
BY
Jn. W. McConkey
ATTORNEY

Patented May 30, 1933

1,911,420

UNITED STATES PATENT OFFICE

VINCENT BENDIX, OF CHICAGO, ILLINOIS, AND LUDGER E. LA BRIE, OF SOUTH BEND, INDIANA, ASSIGNORS TO BENDIX BRAKE COMPANY, OF SOUTH BEND, INDIANA, A CORPORATION OF ILLINOIS

BRAKE

Application filed December 3, 1927. Serial No. 237,373.

This invention relates to brakes, and is illustrated as embodied in an internal expanding brake for an automobile. An object of the invention is to provide a simple and inexpensive, but powerful, brake.

One important feature of the invention relates to the use of an auxiliary brake shoe or the like, bridging across the space between two other shoes connected by a novel floating and preferably expansible joint, the auxiliary shoe in one arrangement being operated by the joint connecting the other shoes.

Various other features of novelty relate to the novel construction of the servo shoe, to its arrangement to operate the main friction device of the brake, and to a novel adjustment for wear.

The above and other objects and features of the invention, including various novel and desirable details of construction, will be apparent from the following description of two illustrative embodiments shown in the accompanying drawings, in which.

Figures 1, 2, 3:
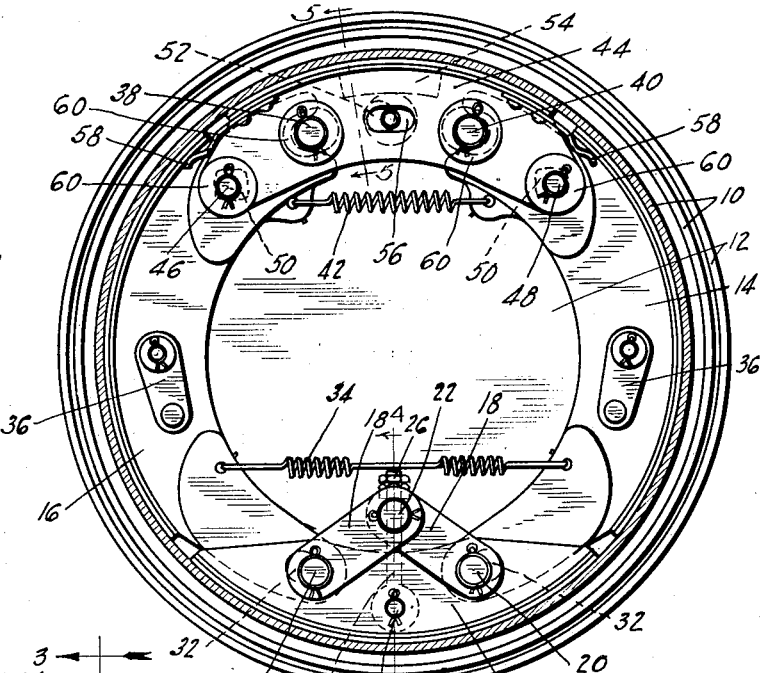
Figure 1 is a vertical section through the brake, just inside the head of the brake drum, showing the brake shoes in side elevation.
Figure 2 is a corresponding vertical section through a modified form of brake.
Figure 3 is a partial radial section, on the line 3—3 of Figure 2, through the applying means of the second brake.
Figure 4:
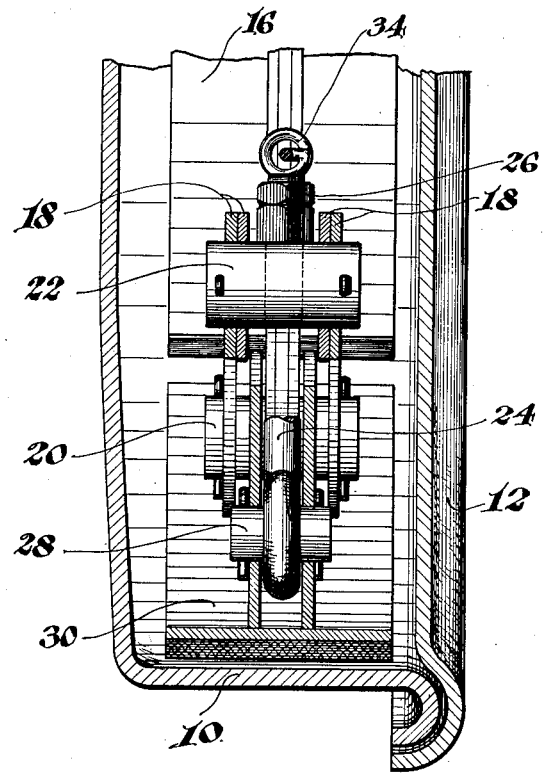
Figure 4 is a partial section on the line 4—4 of Figure 1, showing the adjustment.
Figure 5:
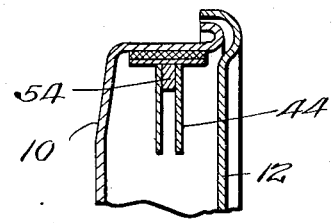
Fig. 5 is a sectional view taken on line 5—5 of Fig. 1.

The brake of Figure 1 includes a rotatable drum 10, at the open side of which is a stationary support such as a backing plate 12, and within which is arranged the friction means of the brake.

The friction means, in this embodiment, includes a main friction device made up of connected shoes 14 and 16. In order to provide for adjusting the brake for wear, the shoes are, according to one feature of the invention, connected by a novel expansible floating joint preferably including a toggle made up of links 18 pivotally connected to the shoes by pivots 20. There may be two pairs of these links, if desired, the members of each pair being arranged on opposite sides of the stiffening web of the shoe 14 or the shoe 16.

The knuckle of the toggle is formed by a pivot 22 connecting the upper ends of links 18, the pivot 22 being centrally pivoted for the passage of a link 24 having nuts 26 threaded on its end, to be adjusted for the purpose of adjusting the brake for wear by variably limiting the breaking of the toggle.

The lower end of link 24 is preferably formed as an eye sleeved on a pivot 28 secured crosswise of an auxiliary shoe 30 which is relatively short, and which is shown as having two spaced stiffening webs straddling the ends of shoes 14 and 16. These webs have slots 32 extending lengthwise of the shoe and embracing the pivots 20. The spreading of toggle 18, to adjust the brake, merely slides the pivots 20 further out in the slots 32.

It will be seen that the thrust of shoe 14 or 16, when the brake is applied, tends to break the toggle 18, so that link 24 is under tension. Preferably a spring 34 tensioned between shoes 14 and 16 also tends to break the toggle and hold the link 24 under tension.

Suitable steady-rests 36, or equivalent positioning devices, of any desired form, may be provided for shoes 14 and 16.

The ends of shoes 14 and 16 are notched out to fit over anchors or stationary pins 38 and 40, against which they are held, when the brake is released, by a return spring 42.

Shoes 14 and 16 are spread apart, to apply the brake, by a novel servo shoe 44, having two spaced webs straddling the ends of shoes 14 and 16, and carrying thrust members or pins 46 and 48 extending crosswise of the shoe through openings 50 in the webs of shoes 14 and 16. The openings 50 are so arranged that shoe 44 may move with the drum away from either shoe 14 or 16, but when it moves toward either of those shoes the thrust member 46 or 48 engages the corresponding shoe and forces it outwardly against the drum.

Shoe 44 may be applied by means such as a cam or eccentric 52 engaging a wear plate 54 secured between the spaced webs of the shoe, for example being spot-welded to the webs. These webs are provided with slots 56 for the shaft of cam 52. Preferably shoe 44 is provided at its opposite ends with leaf springs 58 engaging the ends of shoes 14 and 16, and urging shoe 44 away from the drum. Washers 60 may be secured by cotter pins on the ends of members 38, 40, 46, and 48, to hold shoe 44 laterally.

In the arrangement of Figures 2 and 3, shoes 114 and 116, corresponding to shoes 14 and 16, are directly connected by a suitable expansible joint 118. In this arrangement, the wear plate 154 of shoe 144 is arranged somewhat further down between the webs of the shoe than in Figure 1, for engagement with a cam or roller 152 on an eccentric 70 formed on the end of a shaft 72 journaled in a support 74 secured to the backing plate 12. Shaft 72 is shown provided with an operating lever 76. A plate or stamping 78 may be secured by cotter pins or the like on the ends of members 38 and 40, in place of two of the washers 60.

In operation, when the brake is applied the shoe 44 or 144 is forced against the drum, and turns with the drum in one direction or the other to force the other shoes against the drum, the torque of all of the shoes being taken by one or the other of the anchors 46 or 48.

While two illustrative embodiments have been described in detail, it is not our intention to limit the scope of the invention to those particular embodiments, or otherwise than by the terms of the appended claims.

We claim:

1. A brake comprising, in combination, a friction device having adjacent separable ends, and a servo shoe having spaced parts at each of its ends straddling the corresponding end of the friction device and carrying a thrust member extending crosswise between said parts and engageable with the said corresponding end of the friction device.

2. A brake comprising, in combination, a friction device, and a servo shoe having spaced parts at least at one end straddling the end of the friction device and carrying a thrust member extending crosswise between said parts and engageable with the said end of the friction device.

3. A brake shoe having two spaced stiffening webs and a thrust part at each end of said webs and bridging across the space between them and a wear plate between said webs.

4. A brake shoe having two spaced stiffening webs and a pair of thrust parts carried by said webs and bridging across the space between them at opposite ends of the shoe.

5. A brake comprising, in combination, a pair of friction devices arranged end to end, and a floating expansible joint connecting said devices including a toggle connected at its ends to adjacent ends of said devices and means engaging the knuckle of the toggle for limiting the breaking of the toggle.

6. A brake comprising, in combination, a pair of friction devices arranged end to end, and a floating expansible joint connecting said devices including a toggle connected to adjacent ends of said devices and means engaging the knuckle of the toggle for limiting the breaking of the toggle.

7. A brake comprising, in combination, a pair of friction devices arranged end to end, and a floating expansible joint connecting said devices including a toggle connected to adjacent ends of said devices and means engaging the knuckle of the toggle for limiting the breaking of the toggle, said means comprising a link mounted on a fixed pivot at one end and connected to the knuckle of the toggle at its other end.

8. A brake comprising, in combination, a pair of friction devices arranged end to end, and a floating expansible joint connecting said devices including a toggle connected to adjacent ends of said devices and means engaging the knuckle of the toggle for limiting the breaking of the toggle, said means comprising a pivoted link connected to the knuckle of the toggle.

9. A brake comprising a pair of shoes arranged end to end, a joint connecting the ends of the shoes, a third shoe overlapping the connected ends of the pair of shoes and connected to said pair of shoes, and anchorage means taking the torque of all three shoes from one or the other of said pair of shoes.

10. A brake comprising a pair of floating shoes arranged end to end, a floating joint connecting the ends of the shoes, and a floating third shoe overlapping the connected ends of the pair of shoes and also connected to said floating joint.

11. A brake comprising, in combination, a drum, at least three shoes engaging the same zone of the drum and the central one of which is operated by the two others, a floating joint connecting said two other shoes behind the central shoe, and means for taking the braking torque from one of said shoes when the drum is turning in one direction and from another of said shoes when the drum is turning in the other direction.

12. A brake comprising, in combination, a drum, at least three shoes engaging the same zone of the drum and the central one of which is operated by the two others, a floating expansible joint connecting said two other shoes behind the central shoe, and torque-taking means for all three shoes arranged adjacent the unconnected ends of said two other shoes.

13. A brake comprising, in combination, a drum, a pair of shoes jointed together at one side of the drum, a third shoe adjacent and operated by the jointed ends of the pair of shoes, and a servo shoe adjacent the unjointed ends of the pair of shoes and arranged to act on at least one of said unjointed ends to apply the brake.

14. A brake comprising, in combination, a drum, a pair of shoes on opposite sides of the drum and which are both arranged to anchor on one shoe when the drum is turning in one direction and on the other shoe when the drum is turning in the other direction, an auxiliary shoe adjacent and operated by the ends of the pair of shoes at one side of the drum, and a servo shoe adjacent the ends of the pair of shoes at the side of the drum opposite the auxiliary shoe and arranged to act on at least one of said ends to apply the brake.

15. A brake comprising, in combination, a friction device, and a servo shoe operating the friction device and carrying a leaf spring tensioned against the friction device in a direction tending to move the servo shoe toward released position.

16. A brake comprising, in combination, a friction device, and a servo shoe adjacent the ends of the friction device and carrying leaf springs tensioned against the ends of the friction device in a direction tending to move the servo shoe toward released position.

In testimony whereof, we have hereunto signed our names.

VINCENT BENDIX.
LUDGER E. LA BRIE.